United States Patent
Kobyakov et al.

(10) Patent No.: US 6,992,814 B2
(45) Date of Patent: Jan. 31, 2006

(54) WIDE-BAND RAMAN AMPLIFIERS

(75) Inventors: Andrey Kobyakov, North Brunswick, NJ (US); Michael Vasilyev, Belle Mead, NJ (US)

(73) Assignee: Avanex Corporation, Fremont, CA (US)

( * ) Notice: Subject to any disclaimer, the term of this patent is extended or adjusted under 35 U.S.C. 154(b) by 429 days.

(21) Appl. No.: 10/174,340

(22) Filed: Jun. 17, 2002

(65) Prior Publication Data

US 2003/0231378 A1 Dec. 18, 2003

(51) Int. Cl.
 *H01S 3/00* (2006.01)

(52) U.S. Cl. ..................................................... 359/334
(58) Field of Classification Search .................. 359/334
 See application file for complete search history.

(56) References Cited

U.S. PATENT DOCUMENTS

| | | | | | |
|---|---|---|---|---|---|
| 6,101,024 | A | * | 8/2000 | Islam et al. | 359/334 |
| 6,239,902 | B1 | | 5/2001 | Islam et al. | 359/334 |
| 6,330,104 | B1 | * | 12/2001 | Kim et al. | 359/332 |
| 6,424,455 | B1 | * | 7/2002 | Dmitri | 359/334 |
| 6,459,525 | B1 | * | 10/2002 | Aso et al. | 359/332 |
| 6,519,079 | B1 | * | 2/2003 | Grochocinski et al. | 359/337 |
| 6,545,780 | B1 | * | 4/2003 | Takachio et al. | 1/1 |
| 6,587,260 | B2 | * | 7/2003 | Kikuchi et al. | 359/334 |
| 6,671,083 | B2 | * | 12/2003 | Tanaka et al. | 359/334 |
| 6,697,558 | B2 | * | 2/2004 | Hansen et al. | 385/123 |
| 6,744,553 | B1 | * | 6/2004 | Islam et al. | 359/326 |
| 6,751,421 | B1 | * | 6/2004 | Ranka et al. | 398/141 |
| 6,778,322 | B2 | * | 8/2004 | Kakui et al. | 359/334 |
| 2002/0145793 | A1 | * | 10/2002 | Bock et al. | 359/334 |
| 2002/0171913 | A1 | * | 11/2002 | Batchko et al. | 359/333 |
| 2003/0030890 | A1 | * | 2/2003 | Tanaka et al. | 359/334 |
| 2003/0081307 | A1 | * | 5/2003 | Fludger et al. | 359/334 |

OTHER PUBLICATIONS

Inoue, Kyo. Four–Wave Mixing in an Optical Fiber in the Zero–Dispersion Wavelength Region, Journal of Lightwave Technology vol. 10. No. 11. Nov. 1002. pp. 1553–1561.*

Hedekvist et al. Fiber Four–Wave Mixing Demultiplexing with Inherent Parametric Amplification. Journal of Lightwave Technology. vol. 15. No. 11. Nov. 1997. pp. 2051–2058.*

Schlager et al. Zero–Dispersion wavelength uniformity and four–wave mixing in optical fiber. LEOS 1996. pp. 166–167.*

Ho et al. Parametric Interactions between Pumps and Signals in a Co Pumped Raman Amplifier. CLEO 2002. May 19–24, 2002 vol. 1. pp. 481–482.*

* cited by examiner

*Primary Examiner*—Bernarr E. Gregory
*Assistant Examiner*—Deandra M. Hughes
(74) *Attorney, Agent, or Firm*—Moser, Patterson, Sheridan, LLP

(57) ABSTRACT

A method of improving performance of an optical amplifier and an optical fiber amplifier including an optical fiber having a zero-dispersion wavelength, and at least one Raman pump that provides pump power to the optical fiber at a predetermined wavelength to allow transfer of at least a portion of the pump power to a first adjacent wavelength that is less than the zero-dispersion wavelength, and to a second adjacent wavelength that is greater than the zero-dispersion wavelength.

32 Claims, 7 Drawing Sheets

WIDE-BAND RAMAN AMPLIFIERS

BACKGROUND OF THE INVENTION

1. Field of the Invention

The present invention is directed to a method of improving performance of wideband Raman amplifiers.

2. Description of Related Art

Optical transmission systems that maximize fiber transmission capacity require the use of C-, L-, and, possibly, S-bands simultaneously. In order for these systems to support high data rates and long reach, the use of Raman amplification is virtually mandatory, especially for S-band. Until recently, the bulk of research regarding Raman amplifiers and Raman amplification has been directed toward generation of broader and flatter Raman gain, as well as providing gain in new wavelength windows. In particular, cascaded Raman effect has been widely exploited, where an efficient pump power transfer by about one Stokes shift toward longer wavelength, is repeated several times to improve Raman gain performance.

Further modification of this cascading method has been proposed in U.S. Pat. No. 6,239,902 and U.S. Pat. No. 6,239,903 to Islam et al. These references teach broadening of the Raman pump spectrum by positioning one of the intermediate Raman orders near zero-dispersion wavelength $\lambda_0$ to subsequently transfer the broadened spectrum by one or more Stokes shift toward longer wavelengths. This broadening of the Raman pump spectrum occurs due to an effect known in literature as four-wave-mixing, parametric amplification, or modulation instability.

SUMMARY OF THE INVENTION

Applicants have recognized that in a wide-band Raman amplifier, the pump-to-pump interaction results in power transfer from the short-wavelength pumps ("bluemost" pumps) to the long-wavelength pumps ("redmost" pumps). As a result, power of the bluemost Raman pumps operating in the shorter wavelengths is attenuated with distance at a much faster rate than power of the redmost pumps operating in the longer wavelengths. This disparity in effective attenuation contributes to a noise-figure degradation for short-wavelength signals in optical amplifiers and optical systems using such optical amplifiers.

In view of the foregoing, an advantage of the present invention is in providing an improved wide-band Raman amplifier and method for improving performance thereof.

Another advantage of the present invention is in providing such an amplifier and method that reduces noise-figure degradation for short-wavelength signals to extend the penetration of the short-wavelength pump into the fiber span.

Yet another advantage of the present invention is in provide such an amplifier and method that reduces Raman noise figure tilt and reduces required launch power for short-wavelength pumps.

Still another advantage of the present invention is in providing such an amplifier and method where longer-wavelength pumps are used to create parametric gain for short-wavelength pumps.

These and other advantages and features of the present invention are attained by an optical fiber amplifier including an optical fiber having a zero-dispersion wavelength, and at least one Raman pump that provides pump power to the optical fiber at a predetermined wavelength to allow transfer of at least a portion of the pump power to a first adjacent wavelength that is less than the zero-dispersion wavelength, and to a second adjacent wavelength that is greater than the zero-dispersion wavelength.

In one embodiment, the predetermined wavelength is within about 5 nm inclusive, and preferably within about 1 nm, from the zero-dispersion wavelength of the optical fiber. In another embodiment, the predetermined wavelength is substantially same as the zero-dispersion wavelength of the optical fiber.

In accordance with another embodiment, the optical fiber amplifier also includes a short-wavelength Raman pump that provides pump power to the optical fiber at the first adjacent wavelength, the pump power from the short-wavelength Raman pump being augmented by the portion of the pump power from the at least one Raman pump that is transferred to the first adjacent wavelength.

In accordance with still another embodiment, the optical fiber amplifier also includes a long-wavelength Raman pump that provides pump power to the optical fiber at the second adjacent wavelength, the pump power from the long-wavelength Raman pump being augmented by the portion of the pump power from the at least one Raman pump that is transferred to the second adjacent wavelength.

In one embodiment, the first adjacent wavelength and the second adjacent wavelength are substantially symmetrically positioned about the zero-dispersion wavelength. In another embodiment, the midpoint between the first adjacent wavelength and the second adjacent wavelength is within about 5 nm inclusive, and preferably within 1 nm, from the zero-dispersion wavelength.

In another embodiment of the present invention, the at least one Raman pump is a first Raman pump that provides pump power to the optical fiber at a wavelength less than the zero-dispersion wavelength, and a second Raman pump that provides pump power to the optical fiber at a wavelength greater than the zero-dispersion wavelength. In such an embodiment, the zero-dispersion wavelength is substantially midway between wavelength of the first Raman pump and wavelength of the second Raman pump. Alternatively, in another variation, the midpoint between wavelength of the first Raman pump and wavelength of the second Raman pump is within about 5 nm inclusive, preferably within about 1 nm, from the zero-dispersion wavelength.

In one embodiment, the zero-dispersion wavelength of the optical fiber is in a range between approximately 1400 nm to 1520 nm inclusive. In another embodiment, the zero-dispersion wavelength of the optical fiber is in a range between approximately 1445 nm to 1455 nm inclusive. In yet another embodiment, the zero-dispersion wavelength of the optical fiber is in a range between approximately 1490 nm to 155 nm inclusive.

In accordance with another aspect of the present invention, a method of improving performance of a wide-band Raman amplifier is provided, the method including the step of providing an optical fiber having a zero-dispersion wavelength, and providing Raman pump power to the optical fiber at a predetermined wavelength in a manner that at least a portion of the pump power is transferred to a first adjacent wavelength that is less than the zero-dispersion wavelength, and at least a portion of the pump power is transferred to a second adjacent wavelength that is greater than the zero-dispersion wavelength.

In another embodiment, the method also includes the step of providing a short-wavelength Raman pump power to the optical fiber at the first adjacent wavelength, the short-wavelength Raman pump power being augmented by the portion of the Raman pump power that is transferred to the first adjacent wavelength.

In yet another embodiment, the method includes the step of providing a long-wavelength Raman pump power to the optical fiber at the second adjacent wavelength, the long-wavelength Raman pump power being augmented by the portion of the Raman pump power that is transferred to the second adjacent wavelength.

In still another embodiment of the present method, the step of providing Raman pump power includes the step of providing pump power at a wavelength less than the zero-dispersion wavelength, and providing pump power at a wavelength greater than the zero-dispersion wavelength.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

As will be discussed in further detail below, the present invention provides an improved wide-band Raman amplifier and method for improving performance thereof while avoiding the disadvantage of known amplifiers. In this regard, it should be evident that the present invention provides an amplifier and method that reduces noise figure degradation for short-wavelength signals, reduces Raman noise figure tilt, and reduces required power for short-wavelength pumps by using longer-wavelength pumps to create parametric amplification for short-wavelength pumps.

Figure 1:
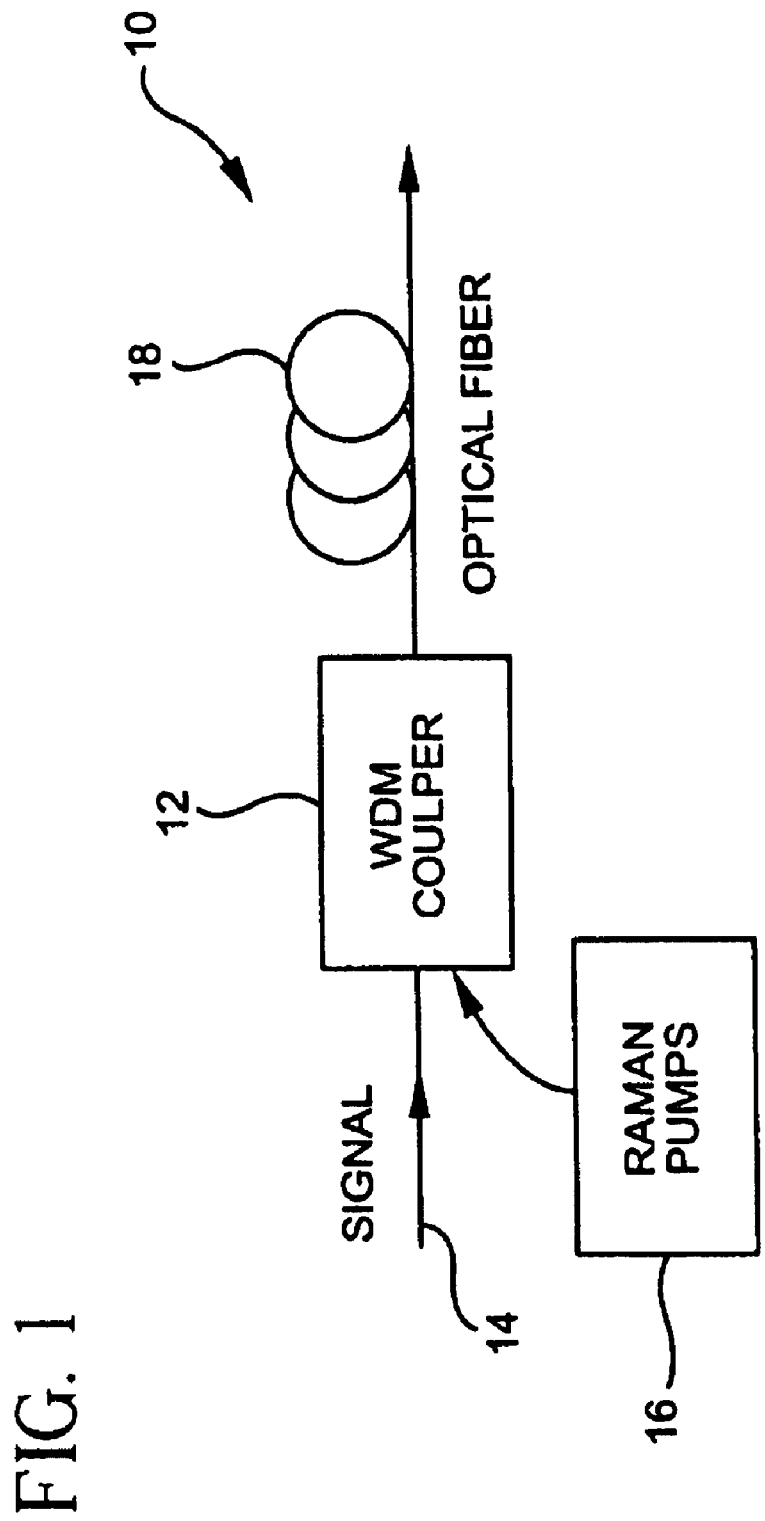
FIG. 1 is a schematic illustration of an optical amplifier in accordance with one embodiment of the present invention.

FIG. 1 is a schematic illustration of an optical amplifier 10 in accordance with one embodiment of the present invention that includes a wavelength division multiplexing ("WDM") coupler 12 which receives an optical signal via fiber 14, and combines it with Raman pumps 16 also connected to the WDM coupler 12, and outputs the optical signal and the Raman pumps to the optical fiber 18 where Raman amplification takes place. As can be appreciated, the optical amplifier 10 is a co-propagating (i.e. forward pumped) amplifier where the optical signal and the pumps propagate in the same direction.

Figure 2:
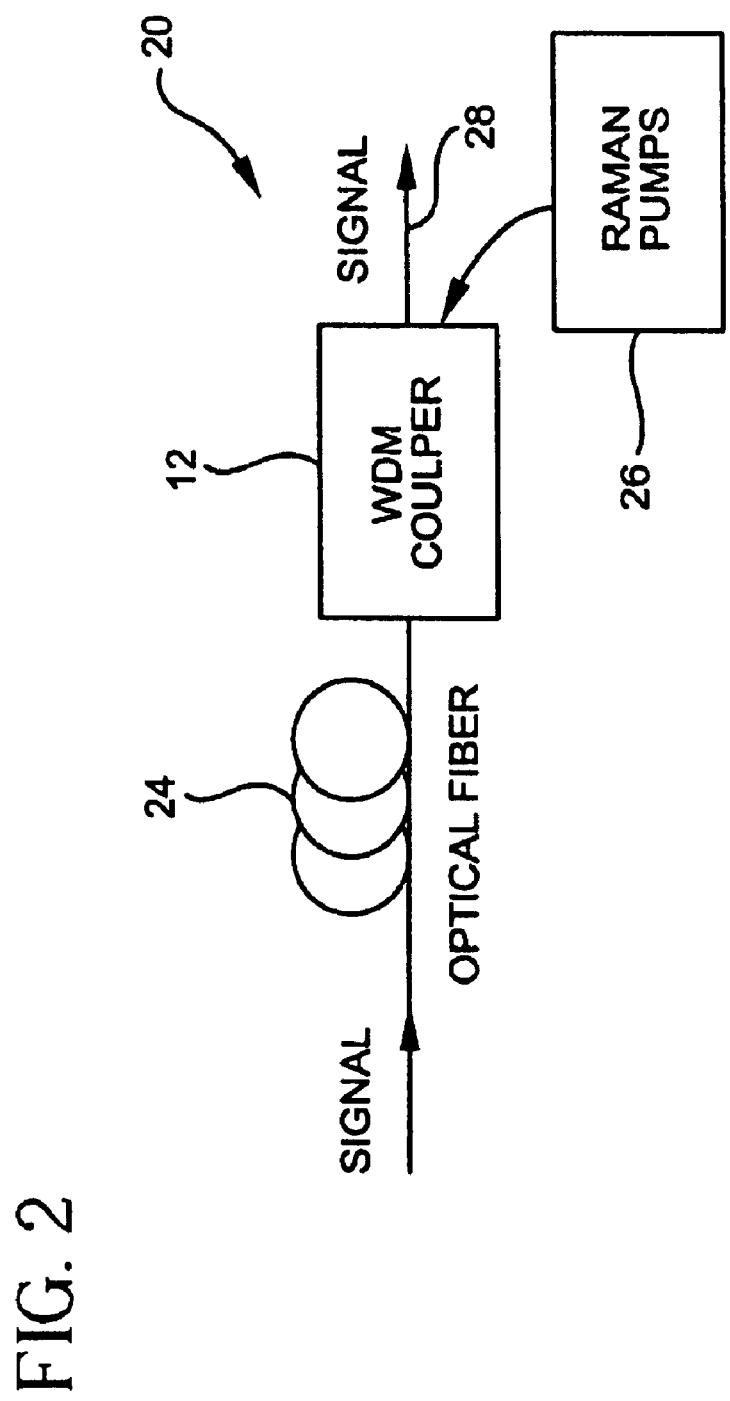
FIG. 2 is a schematic illustration of an optical amplifier in accordance with another embodiment of the present invention.

FIG. 2 is a schematic illustration of an optical amplifier 20 in accordance with another embodiment of the present invention which is similar to that shown in FIG. 1. In this regard, optical amplifier 20 shown also includes a wavelength division multiplexing ("WDM") coupler 22 which receives an optical signal from fiber 24, couples Raman pumps 26 to the optical fiber 24 to amplify the signal, and outputs the amplified optical signal to optical fiber 28. However, in contrast to the optical amplifier 10 of FIG. 1, the optical amplifier 20 of FIG. 2 is a counter-propagating (backward pumped) amplifier where the optical signal and the pumps propagate in opposite directions. Both optical amplifiers 10 and 20, are operated in the manner in accordance with the present invention described in further detail below.

Figure 3:
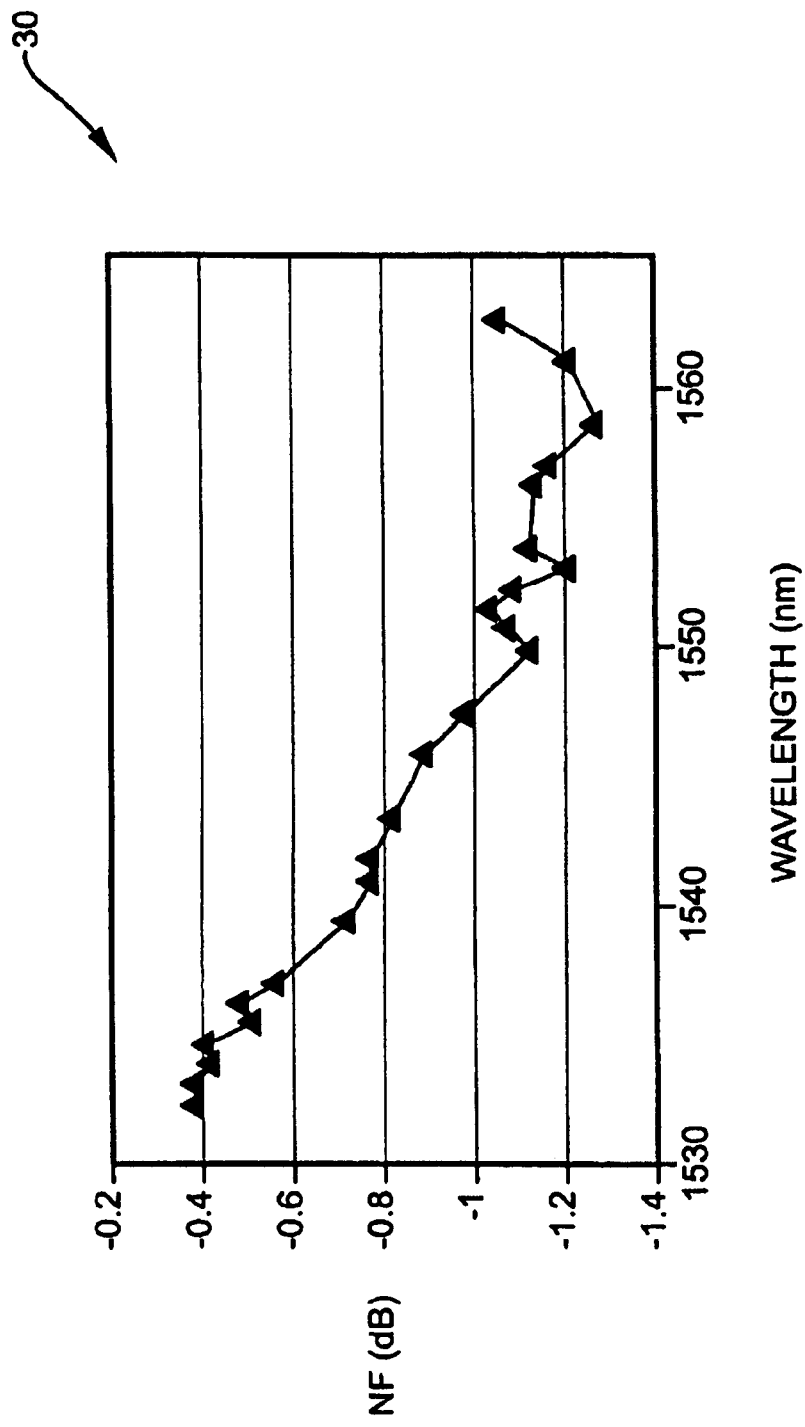
FIG. 3 is a graph illustrating wavelength dependence of Raman noise figure.

FIG. 3 is a graph 30 which illustrates wavelength dependence of Raman noise figure (NF) in Raman amplifiers. As shown, as the wavelength in nanometers (nm) increases along the x-axis, the Raman noise figure in decibels (dB) decreases correspondingly along the y-axis. The experimental data shown in graph 30 was derived using PureGain™ 5000R Raman amplifier by Coring™ with two pump wavelengths where the average Raman gain is 16 dB. Thus, performance of Raman amplifiers vary significantly as the wavelength is varied.

Figure 4:
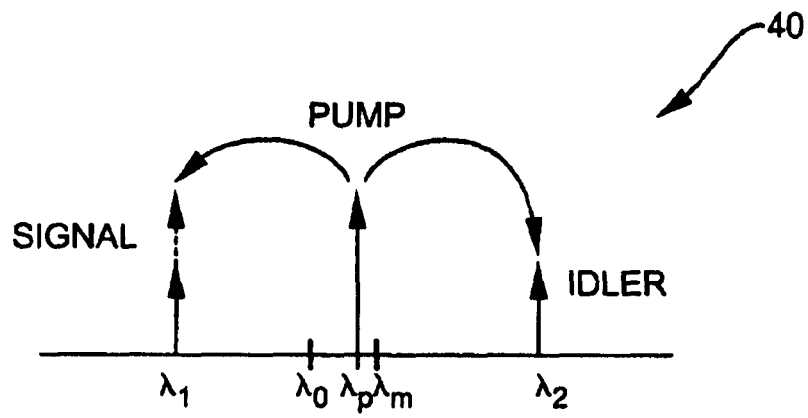
FIG. 4 is a schematic diagram illustrating the operation of an optical amplifier in accordance with one embodiment of the present invention.

FIG. 4 shows a schematic diagram 40 illustrating the operation of an optical amplifier in accordance with one embodiment of the present invention where the effect of four-wave mixing, also known as parametric amplification, is used to enable some of the pump power provided by a Raman amplifier to be transferred to one or more shorter-wavelength pumps via four-wave mixing, and consequently, extend the penetration of the short-wavelength pump into the fiber span. In order for the four-wave mixing to be efficient, it has been determined that the phase-matching condition has to be satisfied, either exactly or approximately.

In the illustrated embodiment, phase-matching condition is greatly facilitated by providing a Raman pump that provides pump power to the optical fiber (for instance, optical fibers 18 or 24 shown in FIGS. 1 and 2, respectively) at a predetermined wavelength ($\lambda_P$) also indicated as "Pump" where at least a portion of the pump power from the Raman pump is transferred to a first adjacent wavelength ($\lambda_1$) also indicated as "Signal" that is less than the zero-dispersion wavelength ($\lambda_0$), and to a second adjacent wavelength ($\lambda_2$) also indicated as "Idler" that is greater than the zero-dispersion wavelength ($\lambda_0$). The portion of the pump power which is transferred is illustrated in diagram 40 by the upwardly extending dotted arrows extending from the first adjacent wavelength ($\lambda_1$), and the second adjacent wavelength ($\lambda_2$).

As shown, in the illustrated embodiment, the pump wavelength ($\lambda_P$) is near the zero-dispersion wavelength ($\lambda_0$), but is at a slightly higher wavelength than the zero-dispersion wavelength ($\lambda_0$). Efficient transfer of some power to the first adjacent wavelength ($\lambda_1$), and to a second adjacent wavelength ($\lambda_2$) can be readily attained by this arrangement. Thus, with this transfer of power, longer-wavelength pumps are used to create parametric gain for short-wavelength pumps which provide power to wavelengths lower than the zero-dispersion wavelength ($\lambda_0$).

It has been found that if the predetermined wavelength ($\lambda_P$) is within about 5 nm inclusive from the zero-dispersion wavelength ($\lambda_0$) of the optical fiber (i.e. +/−5 nm from $\lambda_0$), highly efficient transfer of power can be attained. Further increased transfer efficiency is attained if the predetermined wavelength ($\lambda_P$) is within about 1 nm inclusive from the zero-dispersion wavelength ($\lambda_0$).

It should be noted that in the illustrated embodiment of FIG. 4, the first adjacent wavelength ($\lambda_1$) and the second adjacent wavelength ($\lambda_2$) are positioned about the zero-dispersion wavelength ($\lambda_0$) so that the midpoint ($\lambda_m$) between the first adjacent wavelength ($\lambda_1$) and the second adjacent wavelength ($\lambda_2$) is within about 5 nm inclusive from the zero-dispersion wavelength ($\lambda_0$). Preferably, the midpoint ($\lambda_m$) is within 1 nm from the zero-dispersion wavelength ($\lambda_0$). The frequencies $v_P$, $v_1$, and $v_2$, corresponding to $\lambda_P$, $\lambda_1$, and $\lambda_2$, respectively, must satisfy the equation:

$$2 \cdot v_P = v_1 + v_2.$$

It should further be noted that power from a short-wavelength Raman pump is also illustrated in FIG. 1, the short-wavelength Raman pump providing pump power at the first adjacent wavelength ($\lambda_1$) as shown by the upwardly extending solid arrow extending from the first adjacent wavelength ($\lambda_1$). Again, this pump power from the short-wavelength Raman pump is augmented by the portion of the pump power that is transferred to the first adjacent wavelength ($\lambda_1$) as indicated by the upwardly extending dotted arrow extending from the first adjacent wavelength ($\lambda_1$). Of course, in other embodiments, a long-wavelength Raman pump that provides pump power to the optical fiber at the second adjacent wavelength ($\lambda_2$) may also be provided in a similar manner.

Figure 5:
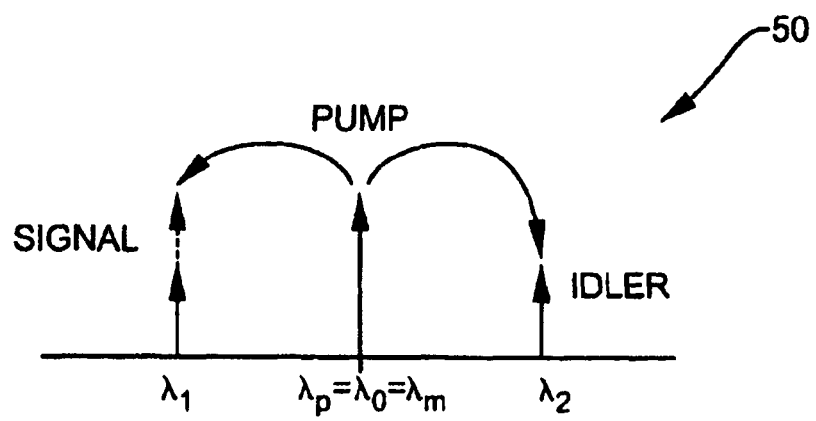
FIG. 5 is a schematic diagram illustrating the operation of an optical amplifier of FIG. 4 where the predetermined wavelength is zero-dispersion wavelength $\lambda_0$.

FIG. 5 is a schematic diagram illustrating the operation of an optical amplifier like that of FIG. 4, where the predetermined wavelength is zero-dispersion wavelength ($\lambda_0$). In a similar manner as discussed relative to the embodiment of FIG. 4, pump power from the Raman pump is provided to allow transfer of at least a portion of the pump power, via four-wave mixing, to a first adjacent wavelength ($\lambda_1$) that is less than the zero-dispersion wavelength ($\lambda_0$), and to a second adjacent wavelength ($\lambda_2$) that is greater than the zero-dispersion wavelength ($\lambda_0$). The portion of the pump power which is transferred is illustrated in diagram 50 by the upwardly extending dotted arrows extending from the first adjacent wavelength ($\lambda_1$), and the second adjacent wavelength ($\lambda_2$). In this embodiment, the predetermined wavelength ($\lambda_P$) is same as the zero-dispersion wavelength ($\lambda_0$) of the optical fiber. In addition, the first adjacent wavelength ($\lambda_1$) and the second adjacent wavelength ($\lambda_2$) are substantially symmetrically positioned about the zero-dispersion wavelength ($\lambda_0$), so in effect, the midpoint ($\lambda_m$) between the first adjacent wavelength ($\lambda_1$) and the second adjacent wavelength ($\lambda_2$) is the same as the zero-dispersion wavelength ($\lambda_0$) as well. Of course, in other embodiments, this need not be the case.

Figure 6:
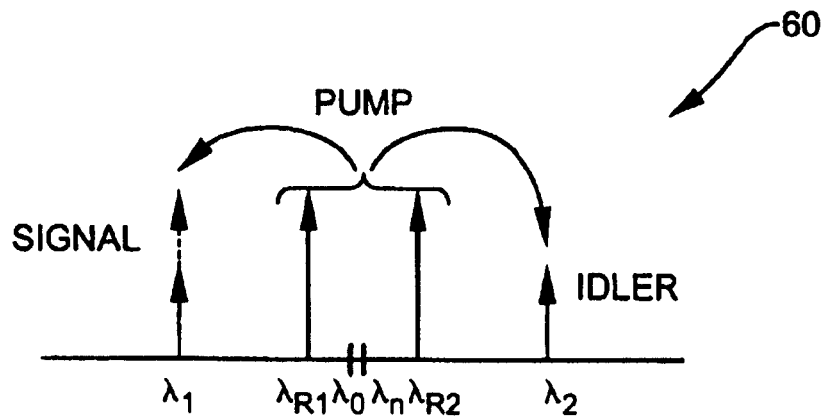
FIG. 6 is a schematic diagram illustrating the operation of an optical amplifier in accordance with another embodiment of the present invention.

FIG. 6 is a schematic diagram 60 illustrating the operation of an optical amplifier in accordance with yet another embodiment of the present invention which also facilitates efficient four-wave mixing and transfer of power to one or more shorter-wavelengths. This embodiment is similar to the embodiment shown in FIG. 4 except that the Raman pump is actually a first Raman pump that provides pump power to the optical fiber at a wavelength ($\lambda_{R1}$) which is less than the zero-dispersion wavelength ($\lambda_0$), and a second Raman pump that provides pump power to the optical fiber at a wavelength ($\lambda_{R2}$) which is greater than the zero-dispersion wavelength ($\lambda_0$).

In accordance with the illustrated embodiment, the first Raman pump (at $\lambda_{R1}$) and the second Raman pump (at $\lambda_{R2}$) transfer at least a portion of the pump power to a first adjacent wavelength ($\lambda_1$) that is less than the zero-dispersion wavelength ($\lambda_0$), and to a second adjacent wavelength ($\lambda_2$) that is greater than the zero-dispersion wavelength ($\lambda_0$). The portion of the pump power which is transferred via four-wave mixing is again, illustrated by the upwardly extending dotted arrows extending from the first adjacent wavelength ($\lambda_1$), and the second adjacent wavelength ($\lambda_2$) in diagram 60.

In addition, in the illustrated embodiment, the midpoint ($\lambda_N$) between wavelength of the first Raman pump (at $\lambda_{R1}$) and wavelength of the second Raman pump (at $\lambda_{R2}$) is within about 5 nm inclusive from the zero-dispersion wavelength ($\lambda_0$). In this regard, midpoint ($\lambda_N$) is preferably within about 1 nm inclusive from the zero-dispersion wavelength ($\lambda_0$) to further enhance efficiency of pump power transfer through four-wave mixing.

Figure 7:
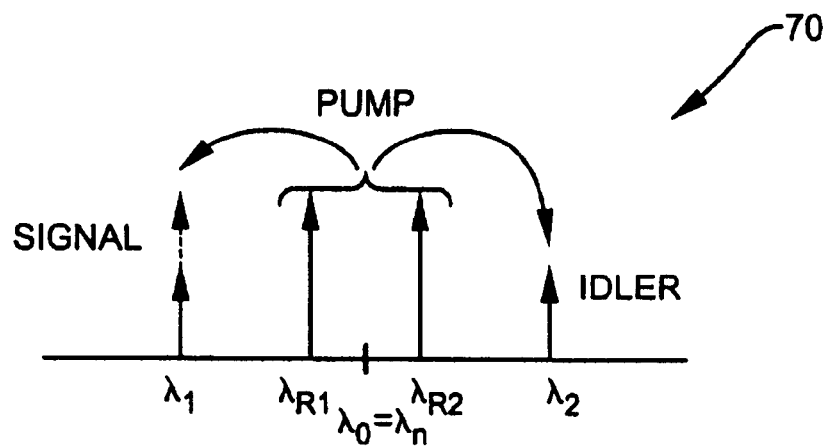
FIG. 7 is a schematic diagram illustrating the operation of an optical amplifier in a manner similar to that of FIG. 6 in accordance with still another embodiment of the present invention.

FIG. 7 is a schematic diagram 70 illustrating the operation of an optical amplifier in accordance with another embodiment of the present invention which is similar to the embodiment shown in FIG. 6 except that the zero-dispersion wavelength ($\lambda_0$) is substantially midway between wavelength of the first Raman pump (at $\lambda_{R1}$) and wavelength of the second Raman pump (at $\lambda_{R2}$). In this regard, the midpoint ($\lambda_N$) is the same as the zero-dispersion wavelength ($\lambda_0$). Like the embodiment of FIG. 6, the first Raman pump (at $\lambda_{R1}$), and the second Raman pump (at $\lambda_{R2}$) transfer at least a portion of the pump power via fourwave mixing, to the first adjacent wavelength ($\lambda_1$), and the second adjacent wavelength ($\lambda_2$), as illustrated by the upwardly extending dotted arrows in diagram 70. The frequencies $v_{R1}$, $v_{R2}$, $v_1$, and $v_2$, corresponding to $\lambda_{R1}$, $\lambda_{R2}$, $\lambda_1$, $\lambda_2$, respectively, must satisfy the equation:

$$v_{R1} + v_{R2} = v_1 + v_2.$$

In the above noted embodiments, particularly efficient transfer of Raman pump power via four-wave mixing occurs in optical fibers having zero-dispersion wavelength ($\lambda_0$) in a range between approximately 1400 nm to 1520 nm, inclusive. In this regard, very effective use of the present invention is attained in optical fibers having zero-dispersion wavelength ($\lambda_0$) in a range between approximately 1445 nm to 1455 nm inclusive, or in a range between approximately 1490 nm to 155 nm inclusive. Correspondingly, the present invention may be effectively used with some popular commercial, non-zero dispersion-shifted fibers, e.g. TrueWave®-RS having zero-dispersion wavelength ($\lambda_0$) near 450 nm, which is in the middle of C+L-band pump spectrum, and LEAF® having zero-dispersion wavelength ($\lambda_0$) near 1500 nm, which is in the middle of extended L-band pump spectrum.

Figure 8:
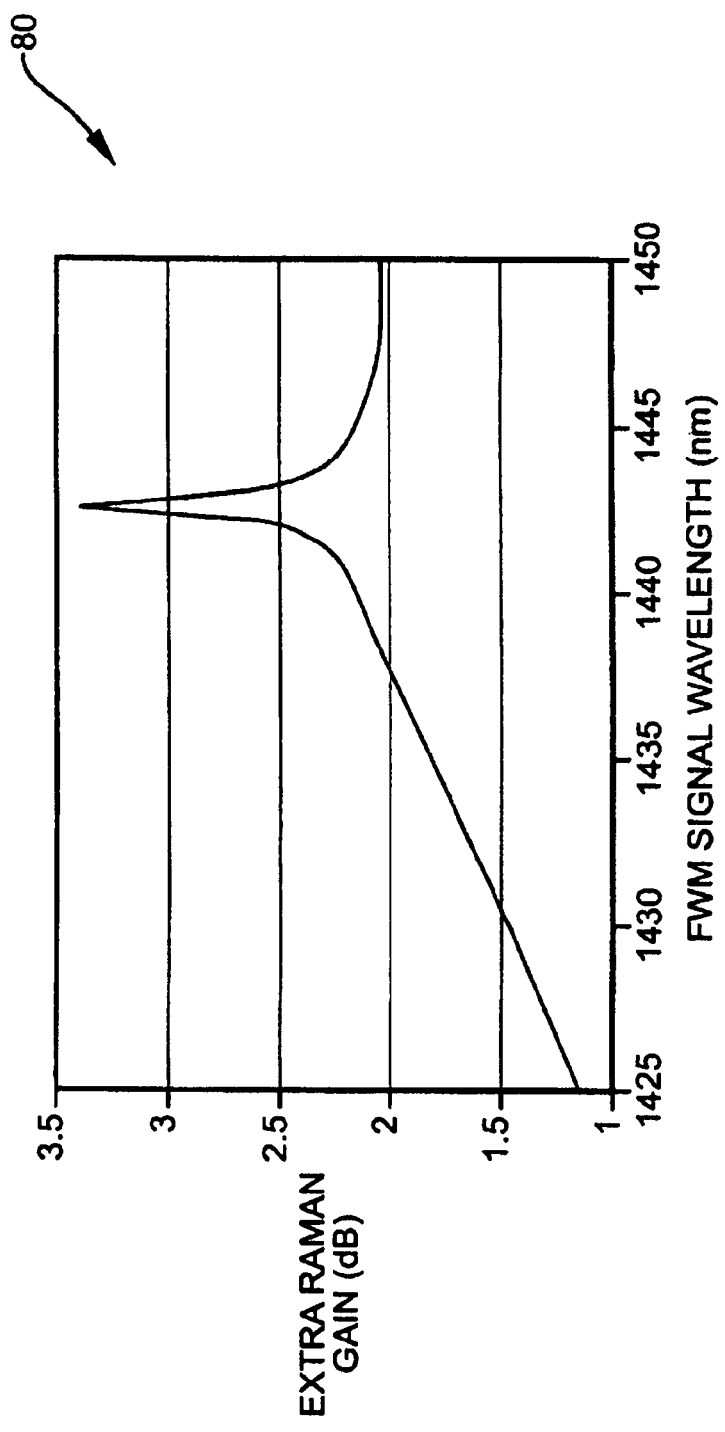
FIG. 8 is a graph showing extra Raman gain created by an optical amplifier in accordance with one implementation of the present invention.
Figure 9:
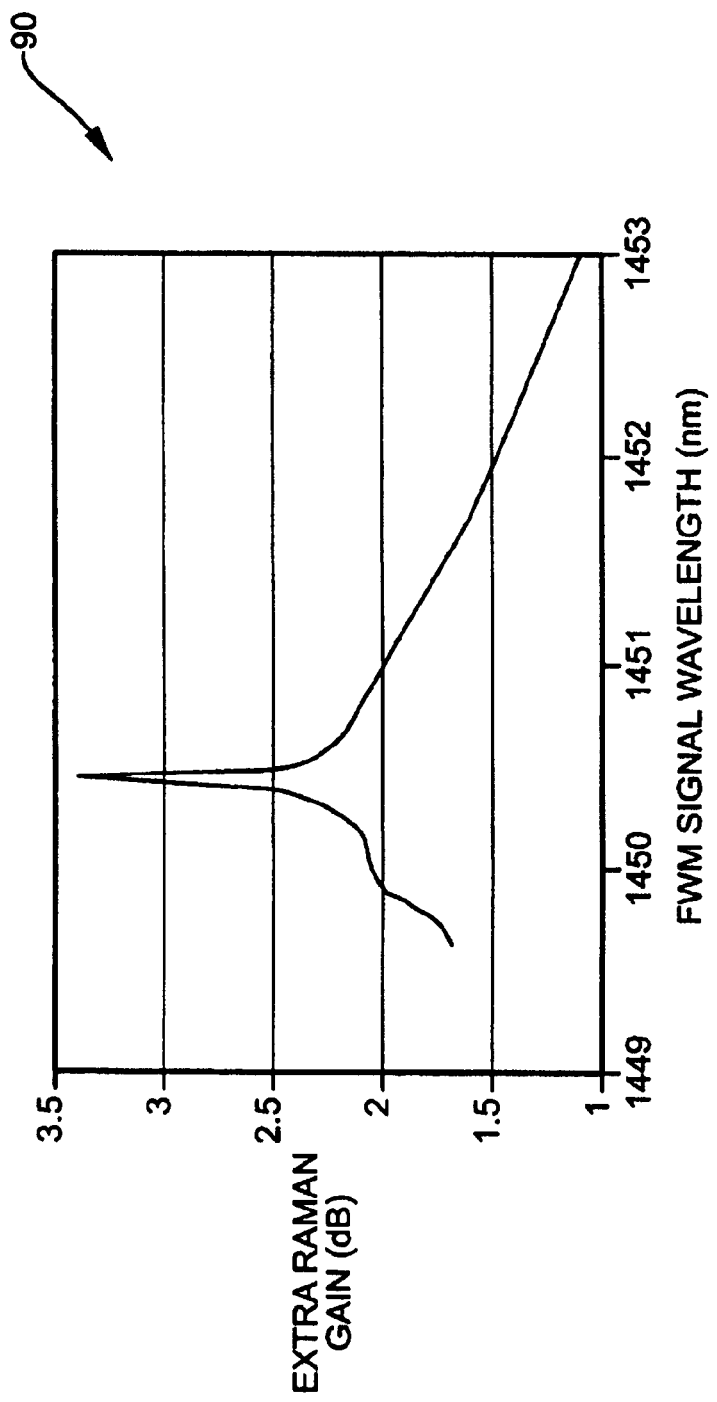
FIG. 9 is a graph showing extra Raman gain created by an optical amplifier in accordance with another implementation of the present invention.

FIGS. 8 and 9 show data graphs 80 and 90, respectively, that illustrates the extra Raman gain created by an optical amplifier in accordance with examples of the present invention. As described above, the extra Raman gain is created by providing Raman pump power at a predetermined wavelength which allows transfer of at least a portion of the pump power to a first adjacent wavelength that is less than the zero-dispersion wavelength, and to a second adjacent wavelength that is greater than the zero-dispersion wavelength.

The increase in gain as shown by graph 80 of FIG. 8 was obtained via parametric amplification of short wavelength Raman pump at wavelength $\lambda_1$ by a Raman pump operated at a fixed predetermined wavelength of $\lambda_P$=1452 nm with launched pump power of 300 mW. Graph 80 correspondingly illustrates the sensitivity of parametric gain to the position of wavelength $\lambda_1$, in units of extra Raman gain created by the amplified short-wavelength pump. The gain in graph 90 of FIG. 9 was obtained via parametric amplification of a short wavelength Raman pump operated at a fixed wavelength $\lambda_1=1430$ nm by a Raman pump at wavelength $\lambda_P$ with launched pump power of 300 mW. Graph 90 correspondingly illustrates the sensitivity of the parametric gain to pump wavelength ($\lambda_P$), again in units of extra Raman gain created by the amplified short-wavelength pump. In both examples of FIGS. 8 and 9, TrueWave®-RS optical fiber with a zero-dispersion wavelength ($\lambda_1$) of 1450 nm was used. Self phase modulation and cross phase modulation effects were also accounted for in the graphs of FIGS. 8 and 9.

Through graphs 80 and 90, it is evident that a noticeable extra Raman gain exists for a wide range of wavelengths $\lambda_1$ and $\lambda_P$. It is also evident that optimizing the combination of the two wavelengths establishes the best four-wave mixing phase matching to give the highest extra Raman gain. However, even if the wavelengths are not optimally matched, noticeable extra Raman gain is still observed, which provides real performance gains for realistic, manufactured optical components including fibers that have varying zero-dispersion wavelengths among the fiber reels, and Raman pumps with slightly varying wavelengths or relatively broad spectra.

It should also be noted that 2 to 3 dB Raman gain increase due to four-wave mixing also produces greater noise-figure improvement than 2 to 3 dB Raman gain increase attained by raising the launch power of the short-wavelength pump. This superior performance is attributable to the fact that four-wave mixing extends the depth of penetration of the Raman gain into the optical fiber span so that the signals are amplified earlier in the span, thereby leading to better noise figure.

Thus, the optical amplifier and method in accordance with the present invention is highly advantageous in that it reduces noise-figure degradation for short-wavelength signals and extends the penetration of the short-wavelength pump into the fiber span. The present invention also reduces Raman noise figure tilt and reduces required power for short-wavelength pumps. These advantages are attained by using longer-wavelength pumps to create parametric gain for short-wavelength pumps as described above. Lastly, the additional gain allows reduction of the number of Raman pump diodes in the optical amplifier.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. An optical fiber amplifier comprising:
    an optical fiber having a zero-dispersion wavelength; and
    at least one Raman pump that provides pump power to said optical fiber at a predetermined wavelength, wherein said predetermined wavelength is near said zero-dispersion wavelength;
    wherein said pump power from said at least one Raman pump is provided at said predetermined wavelength to allow transfer of at least a portion of said pump power to a first adjacent wavelength that is less than said zero-dispersion wavelength, and to a second adjacent wavelength that is greater than said zero-dispersion wavelength.

2. The optical fiber amplifier of claim 1, wherein said predetermined wavelength is within about 5 nm inclusive from said zero-dispersion wavelength of said optical fiber.

3. The optical fiber amplifier of claim 2, wherein said predetermined wavelength is within about 1 nm inclusive from said zero-dispersion wavelength of said optical fiber.

4. The optical fiber amplifier of claim 1, wherein said predetermined wavelength is substantially same as said zero-dispersion wavelength of said optical fiber.

5. The optical fiber amplifier of claim 1, further comprising a short-wavelength Raman pump that provides pump power to said optical fiber at said first adjacent wavelength, said pump power from said short-wavelength Raman pump being augmented by said portion of said pump power from said at least one Raman pump that is transferred to said first adjacent wavelength.

6. The optical fiber amplifier of claim 1, further comprising a long-wavelength Raman pump that provides pump power to said optical fiber at said second adjacent wavelength, said pump power from said long-wavelength Raman pump being augmented by said portion of said pump power from said at least one Raman pump that is transferred to said second adjacent wavelength.

7. The optical fiber amplifier of claim 1, wherein said first adjacent wavelength and said second adjacent wavelength are substantially symmetrically positioned about said zero-dispersion wavelength.

8. The optical fiber amplifier of claim 1, wherein midpoint between said first adjacent wavelength and said second adjacent wavelength is within about 5 nm inclusive from said zero-dispersion wavelength.

9. The optical fiber amplifier of claim 8, wherein midpoint between said first adjacent wavelength and said second adjacent wavelength is within about 1 nm from said zero-dispersion wavelength.

10. The optical fiber amplifier of claim 1, wherein said at least one Raman pump is a first Raman pump that provides pump power to said optical fiber at a wavelength less than said zero-dispersion wavelength, and a second Raman pump that provides pump power to said optical fiber at a wavelength greater than said zero-dispersion wavelength.

11. The optical fiber amplifier of claim 10, wherein said zero-dispersion wavelength is substantially midway between wavelength of said first Raman pump and wavelength of said second Raman pump.

12. The optical fiber amplifier of claim 10, wherein midpoint between wavelength of said first Raman pump and wavelength of said second Raman pump is within 5 nm inclusive from said zero-dispersion wavelength.

13. The optical fiber amplifier of claim 12, wherein midpoint between wavelength of said first Raman pump and wavelength of said second Raman pump is within 1 nm inclusive from said zero-dispersion wavelength.

14. The optical fiber amplifier of claim 1, wherein said zero-dispersion wavelength of said optical fiber is in a range between approximately 1400 nm to 1520 nm inclusive.

15. The optical fiber amplifier of claim 14, wherein said zero-dispersion wavelength of said optical fiber is in a range between approximately 1445 nm to 1455 nm inclusive.

16. The optical fiber amplifier of claim 14, wherein said zero-dispersion wavelength of said optical fiber is in a range between approximately 1490 mm to 11550 nm inclusive.

17. A method of improving performance of a wide-band Raman amplifier comprising the step of:
    providing an optical fiber having a zero-dispersion wavelength; and
    providing Raman pump power to said optical fiber at a predetermined wavelength in a manner that at least a portion of said pump power is transferred to a first adjacent wavelength that is less than said zero-dispersion wavelength, and at least a portion of said pump power is transferred to a second adjacent wavelength that is greater than said zero-dispersion wavelength, wherein said predetermined wavelength is near said zero-dispersion wavelength.

18. The method of claim 17, wherein said predetermined wavelength is within about 5 nm inclusive from said zero-dispersion wavelength of said optical fiber.

19. The method of claim 18, wherein said predetermined wavelength is within about 1 nm inclusive from said zero-dispersion wavelength of said optical fiber.

20. The method of claim 17, wherein said predetermined wavelength is substantially same as said zero-dispersion wavelength of said optical fiber.

21. The method of claim 17, further including the step of providing a short-wavelength Raman pump power to said optical fiber at said first adjacent wavelength, said short-wavelength Raman pump power being augmented by said portion of said Raman pump power that is transferred to said first adjacent wavelength.

22. The method of claim 17, further including the step of providing a long-wavelength Raman pump power to said optical fiber at said second adjacent wavelength, said long-wavelength Raman pump power being augmented by said portion of said Raman pump power that is transferred to said second adjacent wavelength.

23. The method of claim 17, wherein said first adjacent wavelength and said second adjacent wavelength are substantially symmetrically positioned about said zero-dispersion wavelength.

24. The method of claim 17, wherein midpoint between said first adjacent wavelength and said second adjacent wavelength is within about 5 nm inclusive from said zero-dispersion wavelength.

25. The method of claim 24, wherein midpoint between said first adjacent wavelength and said second adjacent wavelength is within about 1 nm inclusive from said zero-dispersion wavelength.

26. The method of claim 17, wherein said step of providing Raman pump power includes the step of providing pump power at a wavelength less than said zero-dispersion wavelength, and providing pump power at a wavelength greater than said zero-dispersion wave length.

27. The method of claim 26, wherein said zero-dispersion wavelength is substantially midway between said wavelength less than said zero-dispersion wavelength and said wavelength greater than said zero-dispersion wavelength.

28. The method of claim 26, wherein midpoint between said wavelength less than said zero-dispersion wavelength and said wavelength greater than said zero-dispersion wavelength is within about 5 nm inclusive from said zero-dispersion wavelength.

29. The method of claim 28, wherein midpoint between said wavelength less than said zero-dispersion wavelength and said wavelength greater than said zero-dispersion wavelength is within about 1 nm inclusive from said zero-dispersion wavelength.

30. The method of claim 17, wherein said zero-dispersion wavelength of said optical fiber is in a range between approximately 1400 nm to 1520 nm inclusive.

31. The method of claim 30, wherein said zero-dispersion wavelength of said optical fiber is in a range between approximately 1445 nm to 1455 nm inclusive.

32. The method of claim 30, wherein said zero-dispersion wavelength of said optical fiber is in a range between approximately 1490 nm to 1550 nm inclusive.

* * * * *